United States Patent [19]

Takla

[11] Patent Number: 4,636,976
[45] Date of Patent: Jan. 13, 1987

[54] BIT SHIFTING APPARATUS

[75] Inventor: Nabil Takla, San Jose, Calif.

[73] Assignee: Data General Corporation, Westboro, Mass.

[21] Appl. No.: 655,959

[22] Filed: Sep. 28, 1984

[51] Int. Cl.⁴ .............................................. G06F 7/00
[52] U.S. Cl. .................................. 364/900; 364/715; 377/64
[58] Field of Search ... 364/200 MS File, 900 MS File, 364/715, 724; 377/64, 69, 106, 115, 116

[56] References Cited

U.S. PATENT DOCUMENTS

| | | | |
|---|---|---|---|
| 3,887,299 | 6/1975 | Lindgren | 364/900 |
| 3,997,771 | 12/1976 | Perlowski et al. | 364/900 |
| 4,149,263 | 4/1979 | Prioste | 364/900 |
| 4,383,304 | 5/1983 | Hirashima | 364/715 |
| 4,484,276 | 11/1984 | Porter et al. | 364/200 |
| 4,509,144 | 4/1985 | Palmer et al. | 364/715 X |
| 4,573,135 | 2/1986 | Dieterich | 364/724 |
| 4,583,197 | 4/1986 | Chappell et al. | 364/715 X |

Primary Examiner—Raulfe B. Zache
Assistant Examiner—William G. Niessen
Attorney, Agent, or Firm—Limbach, Limbach & Sutton

[57] ABSTRACT

An improved apparatus for shifting the positions of data bits within a word. A plurality of control means are provided, each of which receives a data bit from the word and which controls the direction of shift of the data bit. A plurality of multiplexer means are provided, each associated with one of the control means. The multiplexer means are interconected among one another and receive a data bit from their associated control means for propagation to one of the other multiplexer means, or receives a data bit from another of the control means and provides the data bit to its associated control means. The multiplexer means are interconnected and controlled in such a manner that the number of control signals required to achieve the desired amount of shifting is minimized. In this manner, a simple, less expensive yet high speed position shifting apparatus is obtained.

10 Claims, 5 Drawing Figures

BIT SHIFTING APPARATUS

DESCRIPTION

1. Technical Field

The present invention is directed generally to the manipulation of binary data bits and, more particularly, to an efficient apparatus for shifting the position of binary data bits by selected amounts in relation to a reference bit position.

2. Background Art

The ability to manipulate the position of binary data bits in a parallel data word is required for a large number of binary operations, including arithmetic operations. Such arithmetic applications include binary multiplication, correlation, normalization, and offsetting.

In the past, the shifting of bits in a parallel word was accomplished by placing the word in a shift register and serially shifting the word one bit at a time through the shift register until the desired amount of shift was achieved. Alternatively, a matrix of switches is used which, by the proper selection of switch closures, permit data in one bit position to be directly routed to the desired new bit position. Typically, the switch matrix requires a switch for each possible path.

The disadvantage of the incremental shifting approach is that an excessive amount of time is required to achieve results. The disadvantage of the switch matrix approach is that a large number of components are required, as well as a large number of signals to control the switches.

DISCLOSURE OF INVENTION

These and other problems of prior apparatus for manipulating the position of binary data bits are overcome by the present invention of an apparatus comprising M stages which communicate with one another and in which each defines a bit position. Each such stage includes multiplexer means and shift control means.

The multiplexer means are responsive to shift magnitude commands and have a common node port and a plurality of controlled ports. The controlled ports are enabled in response to the shift magnitude commands so that data present at the enabled controlled ports are directed to the common node port, and so that data presented at the common node port are directed to the enabled controlled ports.

The shift control means are responsive to shift direction commands. For a particular stage N, the shift control means have a first port which is coupled to the common node port of the associated multiplexer means and a second port which is coupled to a selected controlled port of the multiplexer means in the N−1st stage. The shift control means is also coupled to a signal line, such as a data bus, from which it receives the data bit to be shifted. The shift control means temporarily store the data bit and control the direction of propagation of the data bit between its first and second ports.

The multiplexer means for a particular stage N has M−N controlled ports and the first controlled port of such multiplexer means is coupled to the second port of the shift control means in the N+1st stage. The jth controlled port of the multiplexer means in the Nth stage is coupled to the j−1st controlled port of the multiplexer means in the N+1st stage, where N=1 through M, and j=2 through M−N. The jth controlled ports, including the first controlled port, in each of the N stages are enabled in common.

In operation, the data bits provided for shifting are shifted in position by a magnitude determined by the shift magnitude command, and a direction determined by the shift direction commands.

By use of multiplexer means in each of the M stages and by connecting the multiplexer means between the stages, as described above, a substantial number of data paths can be eliminated over the structures of the prior art, while still maintaining the flexibility and speed available from switch matrix type shifters. Further, the number of control signals are also substantially reduced over that required in the prior art. In total, the present invention provides a shifting apparatus which is greatly reduced in complexity, physical size, and operation, while still maintaining the speed and flexibility of previous arrangements for positionshifting of digital data.

Where the position of P-groups of bits are desired to be shifted, P-banks of the above described M stages can be used. As such, a stage in each bank can handle one bit from each group. For example, the stages in the first bank can handle the first bit from each group. Subsequent banks can handle subsequent bits from the groups. The shifting of bits in a bank are performed in concert with the shifting of bits in the other bank. In this manner nibble shifters, and the like, can be easily and simply implemented.

It is, therefore, an object of the present invention to provide an apparatus for shifting the position of digital data which has reduced physical size and complexity over prior shifting apparatus.

It is another object of the present invention to provide an apparatus for shifting the position of digital data in which a plurality of multiplexer means, which are controlled in common, operate to route the data between associated control means.

It is another object of the present invention to provide a bit position shifting apparatus, having a plurality of control means, each of which accepts a data bit to be shifted and controls the direction of shift of the data bit between the first and second port, and a plurality of multiplexer means, each associated with one of the control means, which multiplexer means are controlled in common and define data paths between each of the control means.

It is a still further object of the present invention to provide an apparatus for shifting the position of digital data, wherein control of the shifting is achieved by supplying commands which specify the direction of shift and commands which specify the amount of shift.

These and other objectives, advantages and features of the present invention will be more readily understood upon consideration of the following detailed description and accompanying drawings.

DETAILED DESCRIPTION OF THE DRAWINGS

Figure 1:
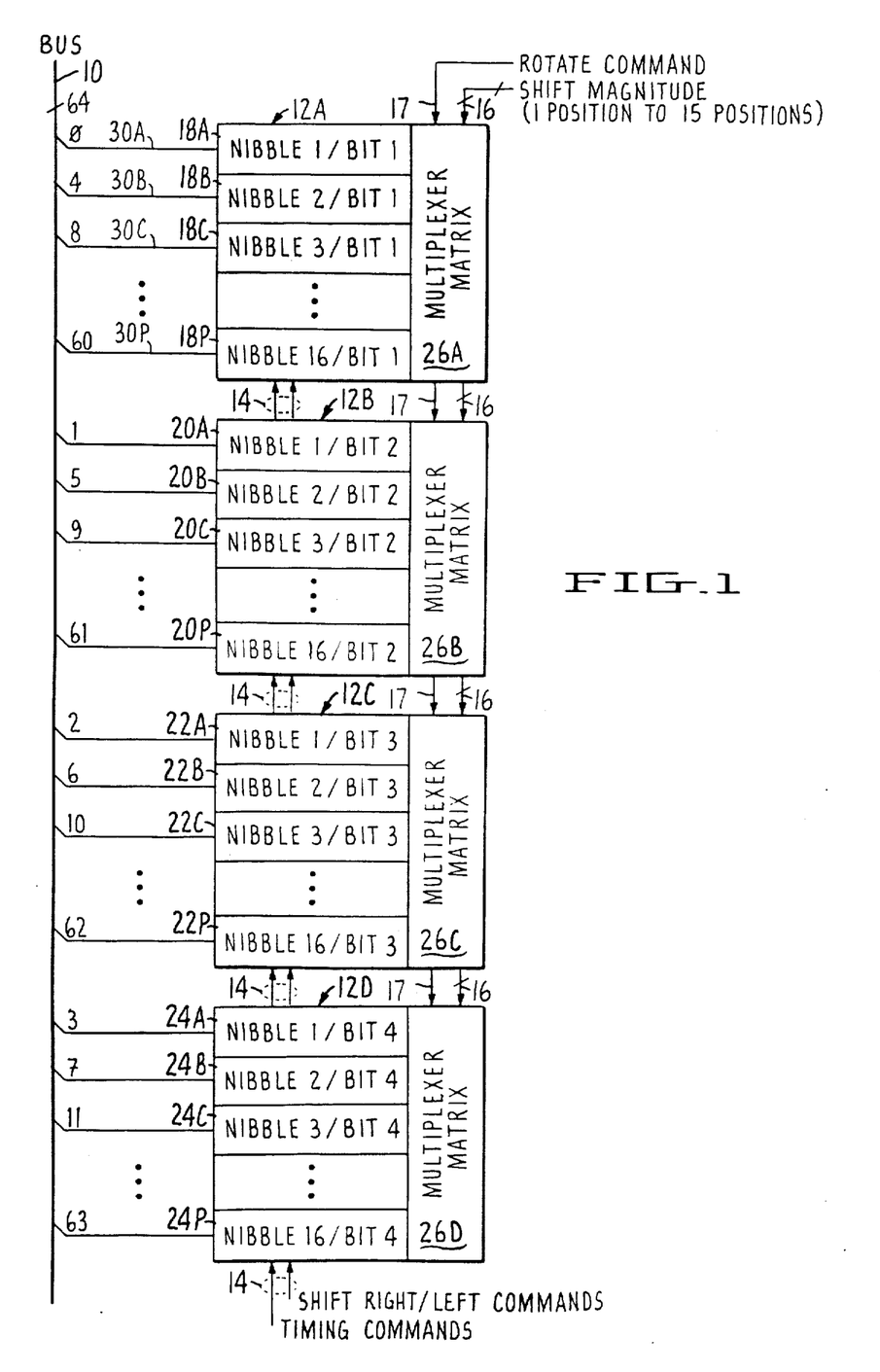
FIG. 1 is a conceptual block diagram of a nibble shifter constructed in accordance with the present invention.
Figure 2:
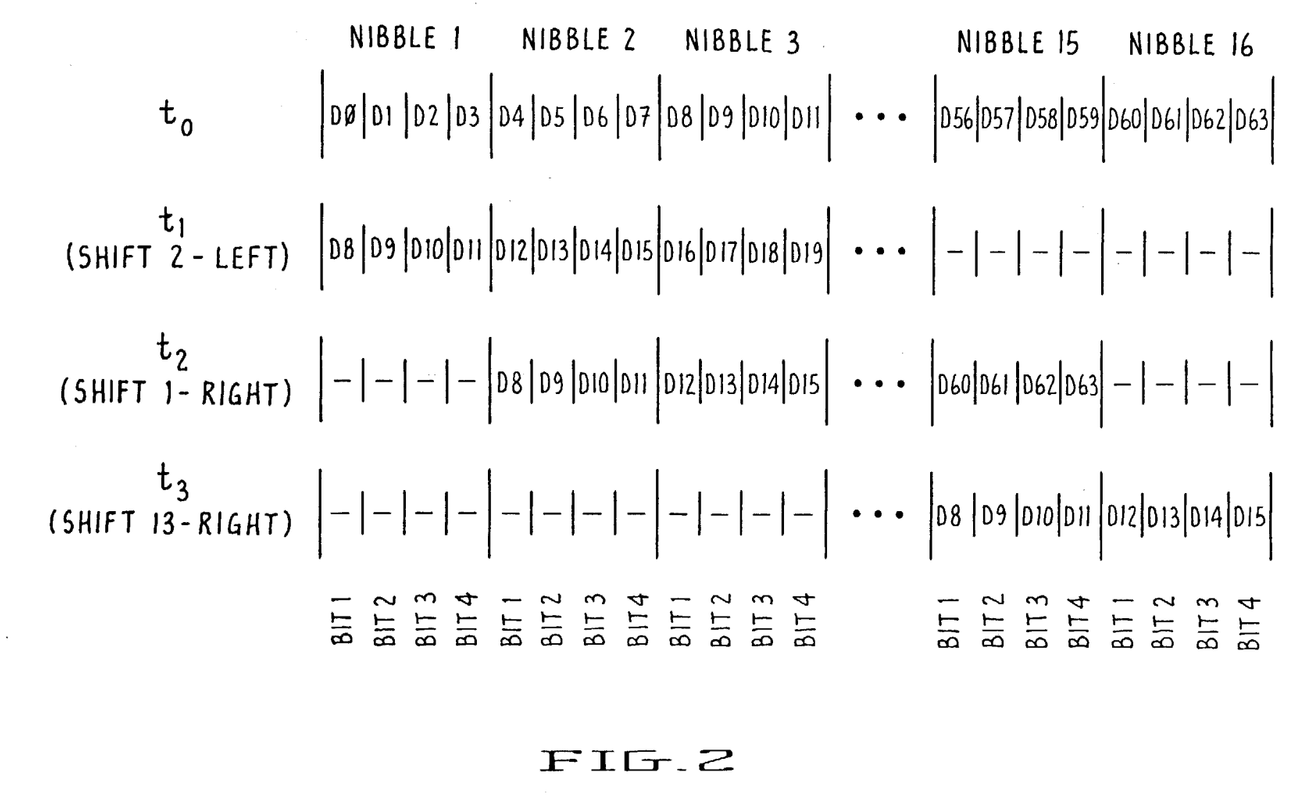
FIG. 2 illustrates a nibble shifting operation.

Referring to FIG. 1, a nibble shifter constructed in accordance with the present invention is shown. As is well-known in the art, a nibble shifter permits the shifting of data bits in a binary word in subdivisions of four bits. This is illustrated in FIG. 2.

Assume, for purposes of this description, that the data word is 64 bits long, such a word contains 16 nibbles, each four bits wide. These nibbles are shown at the top of FIG. 2. At time T0, the binary data are shown so that data bits D0 through D3 are positioned in nibble 1, data bits D4 through D7 are positioned in nibble 2, and so on. At time T1, the data bits have been shifted by two positions and to the left. Thus, the data bits D8 through D11, which were in nibble 3 at time T0, are now in nibble 1. In other words, the four bits in nibble 3 at time T0 were simultaneously shifted to nibble 1 at time T1. Similarly, the data bits which resided in nibble 4 at time T0 now reside in nibble 2 at time T1.

At time T2, the data have been shifted one nibble to the right. Thus, the data bits which were present in nibble 1 at time T1 are now shifted to nibble 2 at time T2. At time T3, the data bits have been shifted 13 nibbles to the right from their positions at time T2. Thus, the data which resided in nibble 2 at time T2 now resides in nibble 15 at time T3.

Returning to FIG. 1, the data to be shifted are provided on bus 10. Assume, for the purposes of this explanation, that the bus has 64 parallel lines, each line supplying a separate data bit. In order to accommodate the 64 bits of data, four banks of shifters are provided. Shifter bank 12A receives 16 bits of data from bus 10. The same is true for banks 12B, 12C and 12D. Banks 12A through 12D are supplied with shift right/left and timing commands on lines 14, as well as shift magnitude commands on line 16.

Each of the banks 12A through 12D manipulates one bit from each of the 16 nibbles. Thus, bank 12A operates upon bit 1 of nibbles 1 through 16, while bank 12B operates upon bit 2 of nibbles 1 through 16, bank 12C operates upon bit 3 of nibbles 1 through 16, and bank 12D operates upon bit 4 of nibbles 1 through 16. It can be seen that each bank has a separate nibble block for each bit that is processed. Thus, bank 12A has a nibble block 18A which processes bit 1 of nibble 1, a nibble block 18B which processes bit 1 of nibble 2, a nibble block 18C which processes bit 1 of nibble 3, and so on.

Each of the nibble blocks of shifter bank 12A through 12D receives a bit from a selected line of bus 10. For purposes of the example, the bus line to which a particular nibble block is attached is indicated by the number associated with the line as it emerges from bus 10. Thus, nibble block 18A receives a data bit from line 0 of bus 10. Similarly, nibble block 22C of block 12C receives a data bit from line 10 of bus 10.

Within each block, 12A through 12D, the individual nibble blocks are interconnected by way of the associated multiplexer matrix 26A through 26D.

Figure 3:
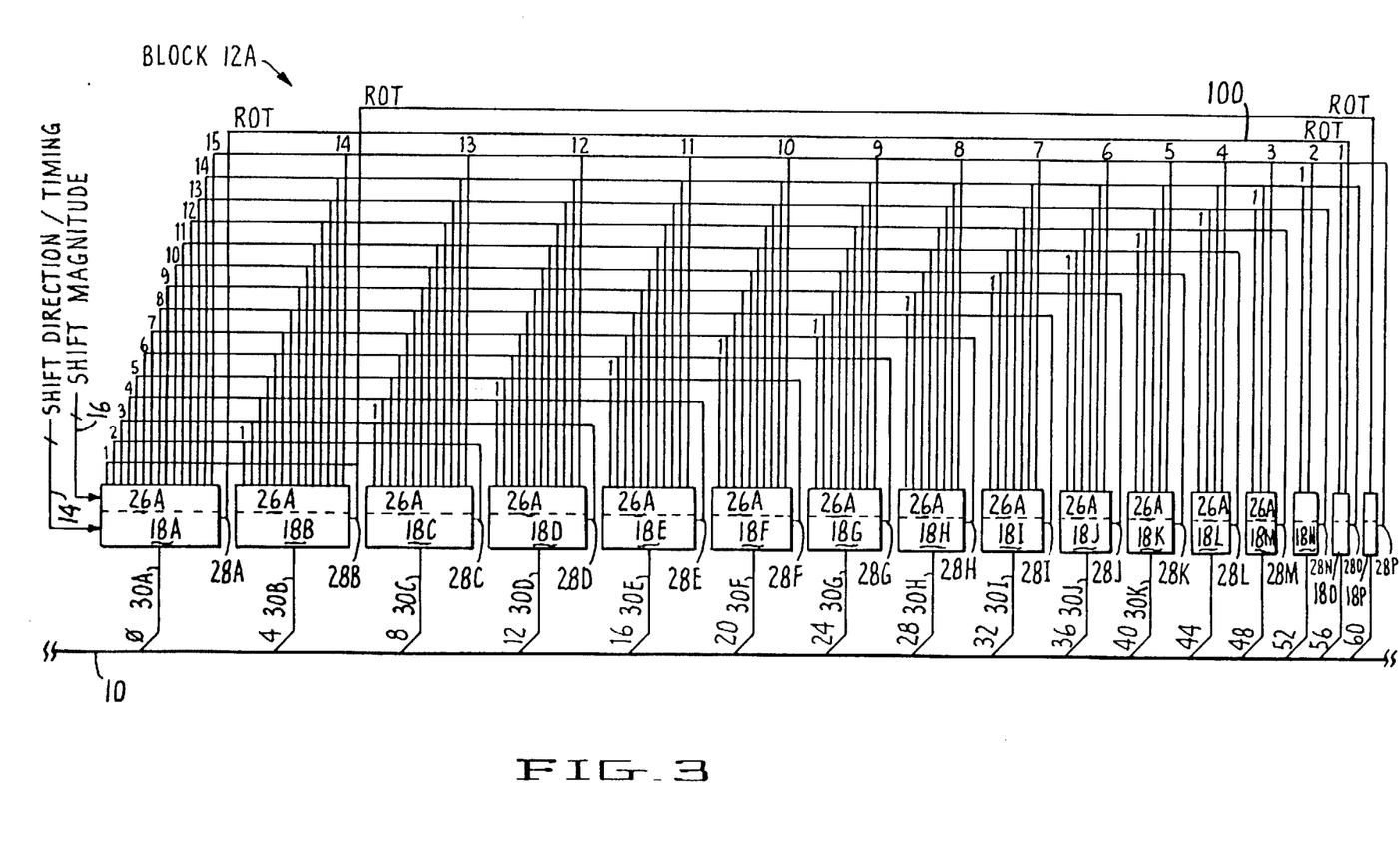
FIG. 3 is a more detailed functional block diagram of one shifter bank of the nibble shifter of FIG. 1.

Referring to FIG. 3, shifter block 12A is shown in greater detail. In this figure, the interconnections between the various nibble blocks, by way of multiplexer matrix 26A, is shown in greater detail.

The lines which emerge from the top of each nibble block represent multiplexer controlled signal lines. The interconnections among these lines represent the signal paths between the multiplexers of each nibble block.

The signal line emerging from the righthand side of each nibble block, i.e., 28A through 28P, represent one of the input/output lines from its associated nibble block. Another signal line from each nibble block connects to a common node of the multiplexer associated with the nibble block. These signal lines are to be understood to be bidirectional, and controlled by multiplexing circuitry, to be described below. These interconnections are shown in greater detail in FIG. 4.

It can be seen from FIG. 3 that the number of signal lines emerging from the nibble blocks toward the right of the Figure decrease, such that there is only a single signal line emerging from nibble block 18P. It is also to be noted that, with the exception of signal line 28A from nibble block 18A, all such other lines 28B through 28P are connected to the first signal line emerging from the previous nibble block. For example, signal line 28B, which emerges from nibble block 18B, is shown connected to the first signal line emerging from the multiplexer portion associated with nibble block 18A.

With respect to the other signal lines emerging from the multiplexer portion 26A of each nibble block, except for nibble block 18A, each such line connects to the next higher line of the previous nibble block. For example, line 1 associated with nibble block 18B connects with line 2 associated with nibble 18A. Similarly, line 14 associated with nibble block 18B connects with line 15, associated with nibble block 18A. In general, where there are M nibble blocks, the Nth multiplexer portion in the series will have M−N controlled signal lines or ports associated with it. With the exception of the first nibble block, the jth signal line from the multiplexer for the Nth nibble block will be connected to the j+1st signal line of the multiplexer for the N−1st nibble block.

From another view point, the jth controlled line in a stage N, i.e. nibble block and multiplexer portion, is coupled to the signal line 28 _ of the N+jth stage. This can be seen from FIGS. 3 and 4. For example, controlled line 3 of multiplexer portion 26A−1, i.e. the first stage, is coupled to signal line 28D in nibble block 18D, i.e. stage (1+3) or 4th stage.

Figure 4A:
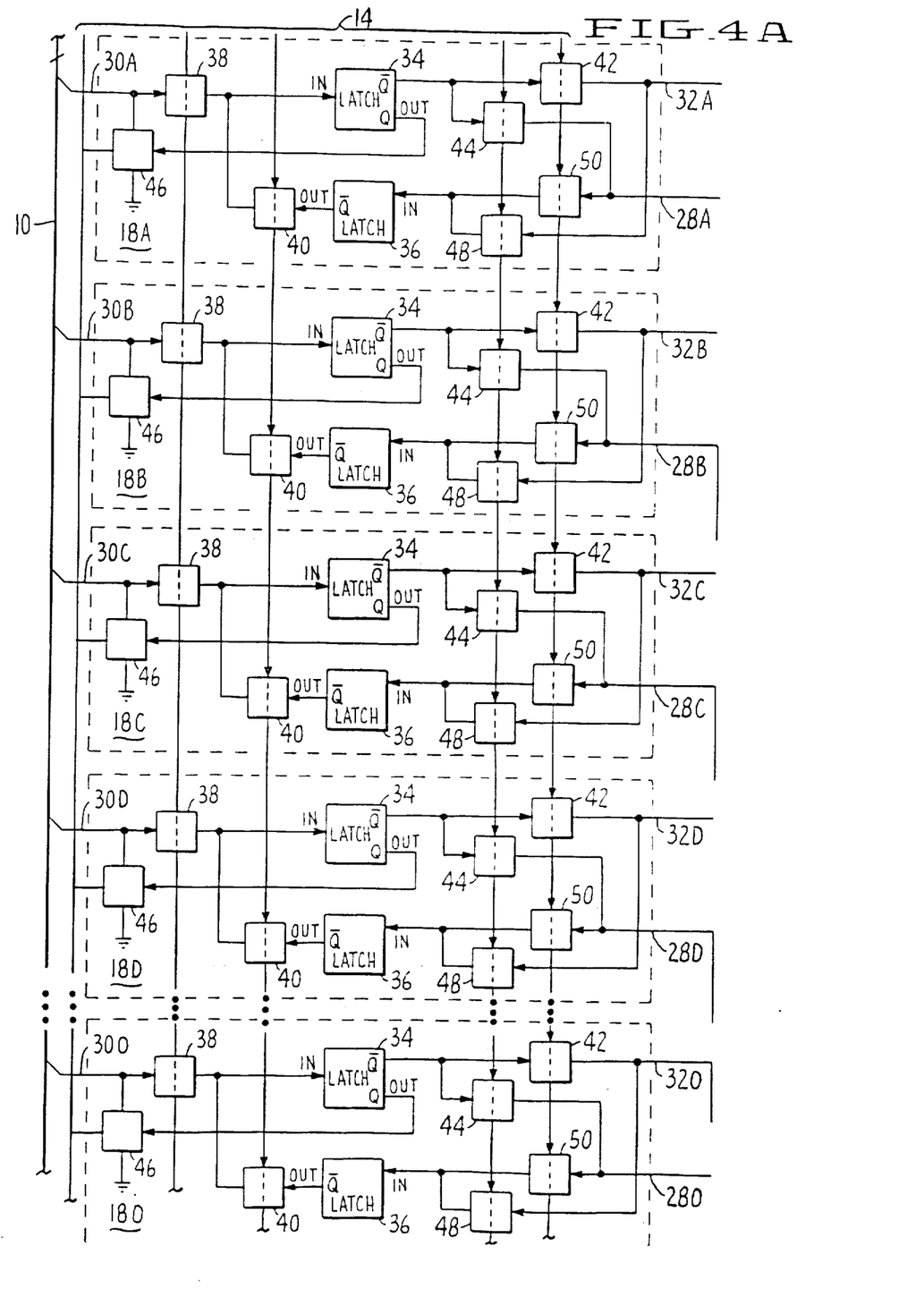
FIG. 4 is a still more detailed functional block diagram of the first four nibble blocks of FIG. 3.
Figure 4B:
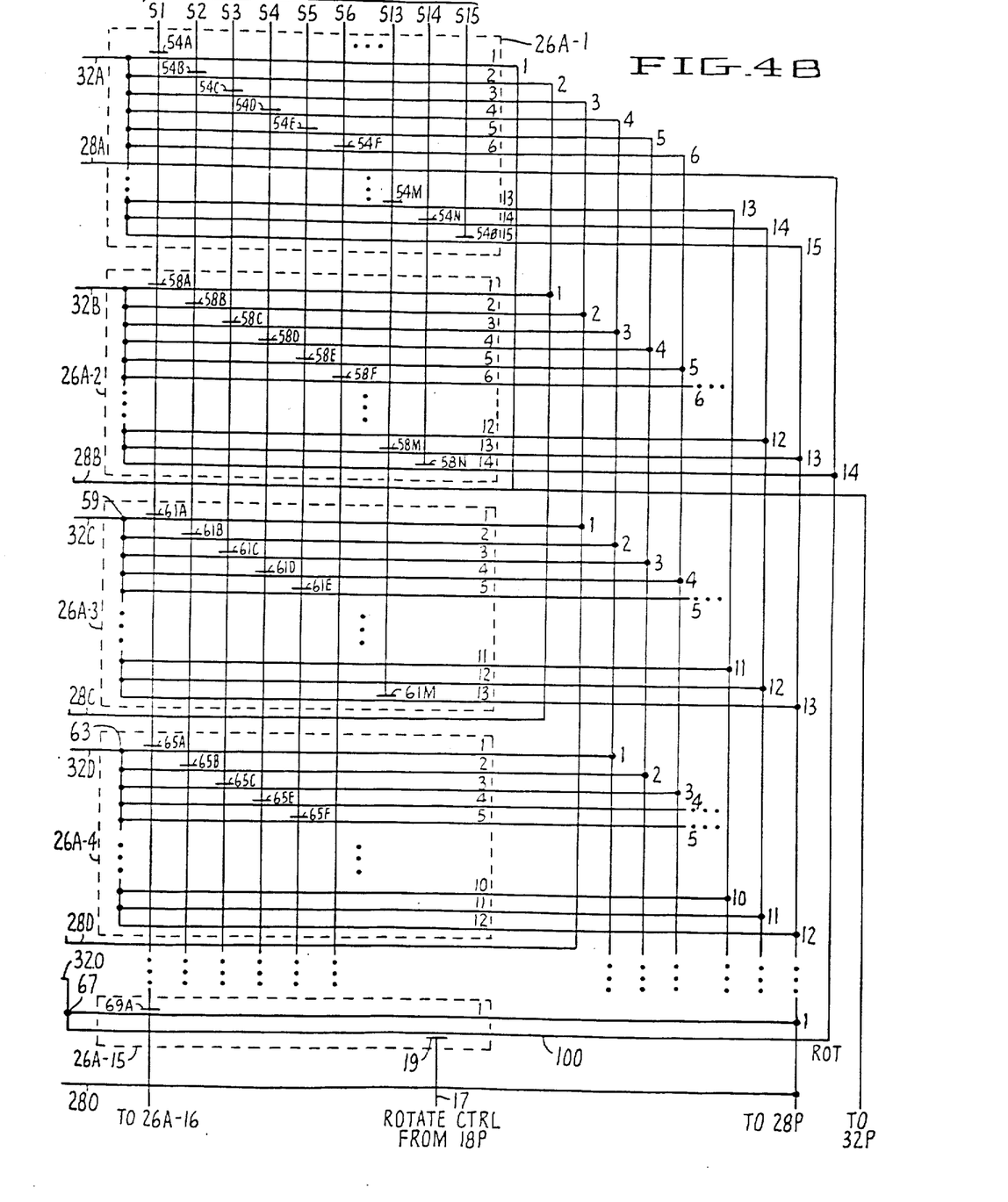

Referring now to FIG. 4, a more detailed description of the multiplexer section 26A and the nibble block section, for example, 18A, will be now provided. Nibble block 18A can be seen to have a data line 30A, by which data is read from or transferred to bus 10. In relation to FIG. 3, data line 30A connects to line 0 of bus 10.

Nibble block 18A also has signal line 28A, described above, which receives data from or supplies data to the multiplexer section associated with another nibble block, as described above. Finally, nibble block 18A, has another signal line 32A which connects to the associated multiplexer portion, for example, 26A−1 and which receives data from or supplies data to the multiplexer section.

The commands received by nibble block 18A on command lines 14 control the input from and output of data to bus 10, and the shifting of data in and out of signal lines 28A and 32A, for example. Nibble block 18A includes a latch 34 and a latch 36 which store data applied on data line 30A, or signal lines 28A and 32A. Latch 34 provides the output data bit while latch 36 stores the input data bit.

A number of gates or switches control the propagation of data between the latches and the data line 30A and signal lines 28A and 32A. Beginning from the data line 30A side of nibble block 18A, the propagation of a signal on data line 30A into latch 34 is controlled by the state of switch 38. Switch 38 is enabled when a write command is supplied thereto. Latch 34 also receives input data from latch 36 via switch 40. Switch 40 is closed when a shift left or shift right operation is occurring. The inverted output of latch 34 is applied to signal line 32A by way of switch 42, and to signal line 28A by way of switch 44. The non-inverted output of latch 34 is applied to driver 46.

Switch 42 is opened and switch 44 is closed during a shift left operation. Conversely, switch 44 is opened and switch 42 is closed during shift right oper- ation.

Latch 36 receives input signals from signal line 32A by way of switch 48 and from signal line 28A by way of switch 50. Switch 50 is opened and switch 48 is closed during a shift left operation.

The signal received by driver 46 from the noninverted output of latch 34 is utilized to drive data line 30A when data is sought to be read out of nibble block 18A and onto bus 10.

In operation, in a data input mode, data propagates from bus 10 over data line 30A and into latch 34. During this operation, switches 42 and 44 are opened to prevent the data from propagating out through signal lines 28A or 32A. Similarly, switch 48 is opened, as is switch 50, to prevent any signals present on signal lines 28A and 32A from affecting the logic state of latch 36.

During a data read operation, switches 42, 44, 48 and 50 remain open and driver circuit 46 is enabled to cause the state of latch 34 to propagate onto data line 30A.

During a shift left operation, data present on signal line 32A propagates through switch 48 and into latch 36. The inverted output of latch 34 propagates onto signal line 28A by way of switch 44. The inverted output of latch 36 is applied to the input of latch 34 by way of switch 40. During this operation switches 42 and 50 are opened to prevent the logic state from latch 34 from affecting the logic state of latch 36.

In the shift right mode, data present on signal line 28A enters latch 36 by way of switch 50. During this operation switches 44 and 48 are opened to prevent data from latch 34 or on signal line 32A from affecting the state of latch 36. The inverted output of latch 34 is then applied to signal line 32A by way of switch 42. The inverted output of latch 36 is applied to the input of latch 34 by way of switch 40.

From the above it can be seen that nibble block 18A operates to store data being processed and to control the flow of data between bus 10, and between signal lines 28A and 32A.

Referring now to the right side of FIG. 4, the multiplexer portion 26A will be described in greater detail. Associated with any one nibble block 18__, e.g. 18A, is multiplexer portion 26A—__, e.g. 26A—1. Each multiplexer portion 26A—__, e.g. 26A—1, has a common node, e.g. 52, which is connected to signal line 32__, e.g. 32A, of it is associated nibble block. The common node, e.g. 52, is also connected to a plurality of controlled signal lines, e.g. 1-15.

With respect to multiplexer portion 26A—1, common node 52 connects to signal line 32A, and to 15 controlled lines, 1 through 15. Signal propagation along these controlled lines is regulated by switches 54A through 54O. These switches, in turn, are activated by signals supplied on shift magnitude command lines 16, e.g. S1-S15.

In a similar manner, multiplexer portion 26A—2, associated with nibble block 18B, has a common node 56 and a plurality of controlled lines 1 through 14. Common node 56 is connected to signal line 32B of nibble block 18B. Signal propagation along the lines 1 through 14 are controlled by switches 58A through 58N. It can be seen from FIG. 4 that shift magnitude command lines 16 are connected in common between the switches in each of the multiplexer portions.

It can also be seen that the controlled signal lines in a particular multiplexer portion are connected to the next higher controlled lines of the previous multiplexer portion.

Figure 5:
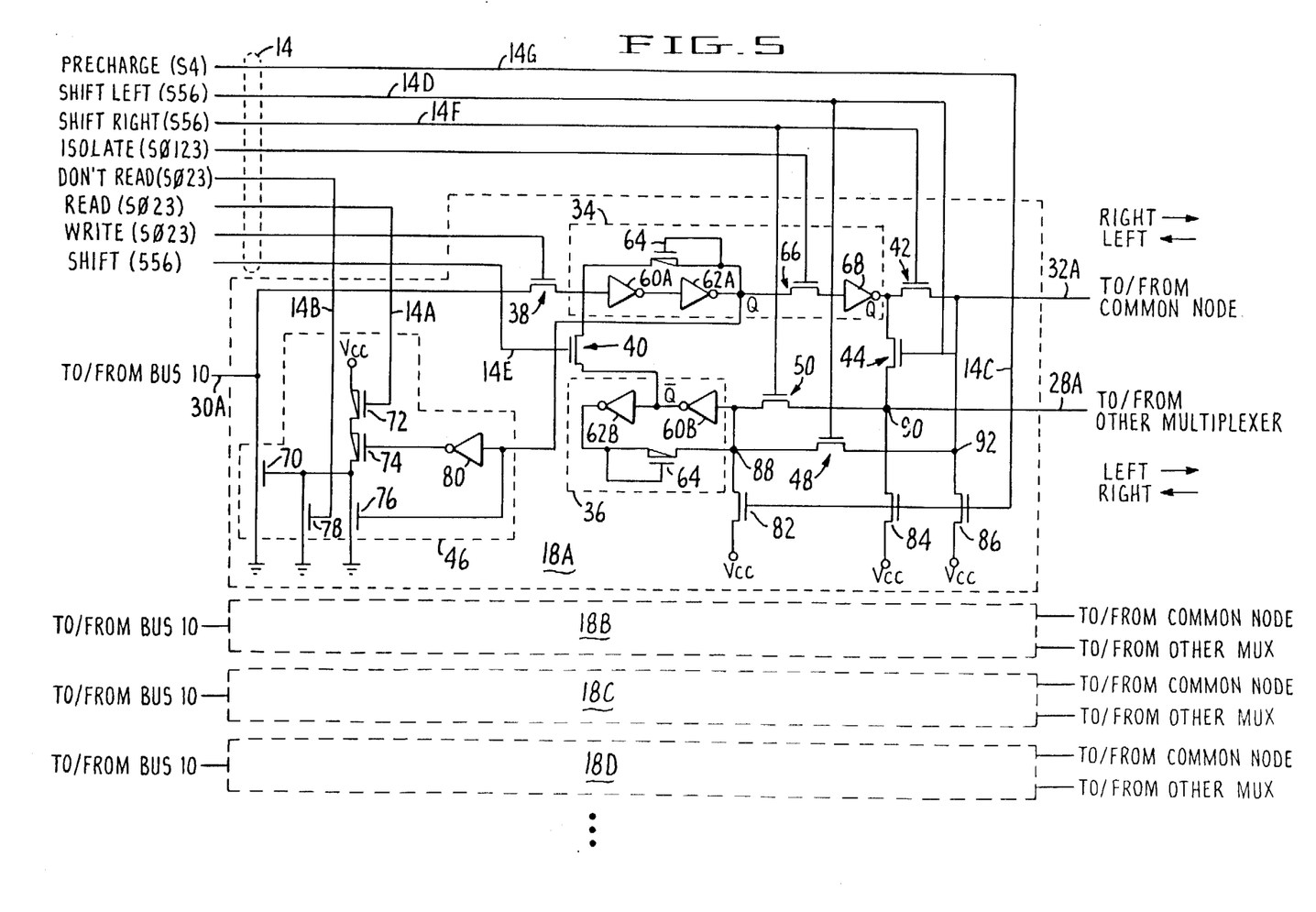
FIG. 5 is a detailed schematic of the control and data path circuitry of one of the nibble blocks in FIGS. 3 and 4.

Referring now to FIG. 5, a more detailed description of a nibble block will now be provided. In order to simplify this discussion, the reference numerals used will correspond to those for nibble block 18A. As can be seen from FIG. 5, switches 38, 40, 42, 44, 48 and 50 are implemented in the circuit by way of pass transistors. Latch 34 and latch 36 are preferably true static latches. They are implemented by connecting two inverters 60__and 62__in series so that the input to inverters 60__is the input to the latch and so that the output of inverter 62__is the non-inverting output of the latch. A transistor 64__is connected between the output of inverter 62__and the input of inverter 60__to provide feedback which maintains the state of the latch at a logic one when the input to the latch has been presented with a logic one level. Transistor 64__is connected so that its gate is tied to its source, such that current flows from the output of inverter 62__to the input of inverter 60__.

The inverting output of latch 34 is obtained by inverting the output of inverter 62A by way of switch 66 and inverter 68. Switch 66 is employed in the preferred embodiment of the present invention to disable the inverting output of latch 34 during selected time intervals so as to provide isolation of the output of latch 34 from the multiplexer portion or from the input latch 36.

The inverted output from latch 36 is obtained from the junction of the output of inverter 60B and the input of inverter 62B.

The non-inverted output from latch 34 is applied to driver circuit 46. The output of driver circuit 46 connects to data line 30A. In the preferred embodiment of the present invention, in order to increase the speed of propagation, signal paths are precharged to a logic one level and logic zero levels are propagated. Thus, when a logic zero level is to be propagated along the line, the line is brought to a logic zero potential; otherwise, the line remains at a logic one potential.

As can be seen from FIG. 5, driver 46 circuitry couples data line 30A to ground by way of pass transistor 70. Pass transistor 70 is turned on by applying $V_{cc}$ through pass transistors 72 and 74. Pass transistor 72 is turned on, whenever a read operation is desired, by applying a logic one level to line 14A.

It is to be noted that the upper lefthand portion of FIG. 5 provides a definition of each of the shift right-/left command lines and timing command lines 14. The information in parenthesis indicates subintervals within a unit timing period. In the preferred embodiment of the present invention, a unit timing period is divided into eight subintervals, the subintervals being numbered from zero through 7. Thus, where a read operation is desired, a logic one level is applied to line 14A during subinterval 0, 2 and 3. When such is the case, transistors 74, 76 and 78 determine whether the $V_{cc}$ level is propagated to the gate of transistor 70.

Transistor 74 is turned on whenever the inverted output of latch 34 is at a logic zero level. Note that inverter 80 inverts the output from latch 34 and applies such inverted signal to the gate of transistor 74. Transistor 76 is activated directly by the noninverted output of latch 34. Thus, when such output is at a logic zero, transistor 76 will be turned off. The effect of turning transistor 76 on is to prevent the propagation of $V_{cc}$ to the gate of transistor 70.

Transistor 78 is turned on whenever a don't-read command is received on line 14B. As indicated, don't-read line 14B is typically activated during subinterval 0, 2 and 3, if at all. The effect of turning on transistor 78 is to bring the gate of transistor 70 to ground, thus keeping transistor 70 off. The effect of turning transistor 70 on is to connect data line 30A to ground. Thus, when the non-inverted output of latch 34 is a logic one, the gate of transistor 70 will be connected to ground, thereby keeping the logic state on data line 30A unchanged. On the other hand, when the non-inverted output of latch 34 is a logic zero, transistor 74 will be turned on, and transistors 76 and 78 will be turned off, thereby turning transistor 70 on, and thereby forcing the state of data line 30A to a logic zero level.

Referring to the bottom righthand corner of FIG. 5, transistors 82, 84 and 86 are utilized in the preferred embodiment to precharge nodes 88, 90 and 92. These transistors are energized by a signal on line 14C. It can be seen that this line is energized during the fourth subinterval of the timing sequence. It is to be noted that the logic state of nodes 90 and 92 determine the logic state of the data bit to be transferred out of or received into the particular nibble block. By precharging all such nodes in the other nibble blocks to a logic one level, and by only changing the state of a node when the logic state of the particular data bit is a logic zero, the speed of the shifting can be significantly enhanced. This technique is called "zero filling". Thus, during subinterval 4 all nodes of the nibble blocks, which correspond to nodes 88, 90 and 92 of nibble block 18A, are preset to a logic one state. Thereafter, the actual logic state of the data bit for each nibble block is applied to the associated node. If the actual logic state is a logic one no change occurs. If the actual logic state is a logic zero, the node is written over to a logic zero state.

In operation of the present invention, switches 42, 44, 48 and 50 are closed when the operation with which they are associated is sought to be performed, otherwise they remain opened. For example, referring to the upper lefthand corner of FIG. 5, line 14D receives the shift left command during subintervals 5 and 6. The shift left command takes the form of a logic one level during subintervals 5 and 6. This causes switches 44 and 48 to be closed during this time period. During this time period, switches 42 and 50 are turned off, or opened.

Thus, a signal present on signal line 32A passes through switch 48 into latch 36. The inverted output of latch 36 is applied to the input of latch 34 by way of switch 40. Switch 40 receives a logic one signal during subintervals 5 and 6 on line 14e so that the switch is closed during this time period. The inverted output of latch 34 is applied to signal line 28A by way of switch 44. Because of the inversion of the signal through latch 36 and the reinversion of the signal through latch 34, a proper logic level is passed to signal line 28A from signal line 32A.

Conversely, when a shift right operation is desired, line 14D will be set to a logic zero level, while line 14F receives a logic one level, during the fifth and sixth subintervals of the timing period. Thus, switches 44 and 48 will be opened while switches 42 and 50 will be closed. In this manner, a signal present at signal line 28A will propagate to the input of latch 36 by way of switch 50. The inverted output of latch 36 will be applied to the input of latch 34. The inverted output of latch 34 will be applied to signal line 32A by way of switch 44 to complete the shifting of the data bit.

The combination of switches 42 and 44, and the combination of switches 48 and 50 can be viewed as multiplexers. Thus, switches 48 and 50 permit selection of the input signal applied to the latch 36 from either signal line 32A (via switch 48) or from signal line 28A (via switch 50). Similarly, the combination of switches 42 and 44 can be viewed as permitting the routing of the inverted output of latch 34 via switch 42 to either signal line 32A or node 92, or via switch 44 to node 90.

From the upper lefthand corner of FIG. 5, it can be seen that the read and write operations between nibble block 18A and bus 10 occur during the 0 or 2 and 3 subintervals of the timing period. During subperiods 1 and 7, signal line 30A is precharged. On the other hand, the shifting operations of nibble block 18A occur during subintervals 4 through 6 of the timing period.

It is to be understood that circuitry described above in connection with FIG. 5 is found in each of the nibble blocks in a shift block, e.g., 12A. These nibble blocks are indicated by the dashed boxes at the bottom of FIG. 5.

Referring to FIGS. 4 and 5, the operation of the present invention will now be discussed. For a given timing period, assume that data on bus 10 is to be shifted right two nibbles. During subintervals 0 or 2 and 3, the data from bus 10 are shifted into latch 34 of each nibble block, e.g., 18A. During this time period, the multiplexer portions, e.g., 26A−1, remain inoperative.

At the fourth subinterval, line 14G is asserted for all nibble blocks. In nibble block 18A this activates transistors 82, 84 and 86 to precharge nodes 88, 90 and 92, respectively. During subintervals 5 and 6, and assuming a shift right operation, line 14F is brought to a logic zero level for all nibble blocks. In nibble block 18A, this causes switches 42 and 50 to be closed. The logic level stored in latch 34 from bus 10 is applied to signal line 32A via switch 42. Similarly, the signal level arriving on signal line 28A is applied to latch 36 by way of switch 50.

During this time, the shift magnitude command lines 16 are activated to cause the appropriate amount of shifting. In this case, because a shift of two nibbles is desired, the shift magnitude line S2, FIG. 4, is asserted. This permits the signal arriving on the activated controlled signal line from another multiplexer to be applied to the common node of the subject multiplexer portion.

For example, in muiltiplexer portion 26A−2, the assertion of line S2 will cause switch 54B in multiplexer poriton 26A−1 and switch 58B in multiplexer portions 26A−2 to be closed. Note that in multiplexer portion 26A−2, this correspond to controlled line 2. Controlled line 2 can be seen connected to controlled line 3 in multiplexer portion 26A−1 and to controlled line 1 in multiplexer portion 26A−3, and finally to signal line 28D of nibble block 18D. Note that with respect to controlled line 3 of multiplexer block 26A−1, switch 54C has not been asserted. Thus, no signal is permitted to propagate along this controlled line. Similarly, in multiplexer block 26A−3, controlled line 1 is controlled by switch 61A. Note that this switch is not activated for this shift operation. Thus, no signal is permitted to propagate along controlled line 1 of multiplexer portion 26A−3.

The only other line to which controlled line 2 of multiplexer block 26A−2 is connected is signal line 28D from nibble block 18D. Note that this block is two positions away from nibble block 18B. Recall also that in a shift right operation, a signal is received by the nibble block 18_from signal line 28_, and that the signal to be propagated to the right is applied by the nibble block 18_to the signal line 32_.

Thus, the signal to be propagated by nibble block 18B is provided by nibble block 18B on signal line 32B. This signal propagates via switch 58B along controlled line 2 of multiplexer portion 26A−2. This signal then flows into signal line 28D of nibble block 18D. This signal is then stored in latch 36 of that block.

Data can then be transferred from the nibble blocks 18_to bus 10 by activation of line 14A during the next unit timing interval.

For a shift left operation, line 14D for all nibble blocks is asserted during subintervals 5 and 6 of the timing period. Assume for purposes of this explanation that a shift of two positions is desired, and also that the progress of data from nibble block 18D is being followed. For nibble block 18D transistor 44 will be closed to cause the output of latch 34 to be applied to signal line 28D. Thus, the signal from nibble block 18D is applied to signal line 28D. The signal then propagates to controlled line 1 of multiplexer portion 28A−3, to controlled line 2 of multiplexer portion 26A−2, and to controlled line 3 of multiplexer portion 26A−1. Of these controlled lines, only controlled line 2 of multiplexer 26A−2 is active. Note that this is caused by the activation of shift magnitude line S2.

The signal then propagates along controlled line 2 of multiplexer portion 26A−2 and onto signal line 32B. Thereafter, the signal is routed into latch 36 by way of switch 50.

An inspection of FIG. 3 and the interconnections between the multiplexer portions 26A will reveal that similar operations, as described above, are performed for achieving shifts in position of the data for fewer and greater numbers of positions.

From the above description it can be seen that the multiplexer portions, for example 26A−1, are preferably bidirectional, 1 to one of N or one of N to 1 selectors. When a shift right operation is performed the multiplexer portions act as 1 to one of N selectors. For a shift left operation, they act as one of N to 1 selectors.

Further, the combination of a nibble block, e.g. 18A, and associated multiplexer portion, e.g. 26A−1, can be viewed as providing a bidirectional, two level multiplexer function. Switches 42, 44, 48 and 50 are controlled to select the direction, left or right, of propagation of the data between signal lines 32A and 28A, and the controlled lines in multiplexer portion 26A−1 select which multiplexer portion or nibble block is to receive or provide the shifted data.

From FIGS. 3 and 4 it can be seen that nibble blocks 18A, 18B, 18O and 18P are coupled together in a manner slightly different from that described above. This is to implement a wrap around function. The reader's attention is directed to the lines labeled ROT in FIG. 3. These lines route the overflow bits, from each end of the shifter, to the opposite end of the shifter, for shifts to the right or left of one or two positions. The rotate operation is controlled by a rotate signal on line 17. This enables the switches, e.g. switch 19, FIG. 4, that permit signal propagation along the rotate lines.

Thus, it is to be noted that signal line 32P of nibble block 18P is coupled to signal line 28B of nibble block 18B. Also, signal line 100 of nibble block 180 is coupled to signal line 28A of nibble block 18A.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

What is claimed:

1. An apparatus for shifting the position of data bits which are arranged in an ordered sequence of M positions, in accordance with shift magnitude commands and shift direction commands, wherein each data bit in the sequence is provided from a different one of a plurality of signal lines in a bus, comprising M stages which communicate with one another and which each define a position, and futher wherein a stage N includes multiplexer means responsive to the shift magnitude commands and having a common-node port and a plurality of controlled ports, wherein ones of the controlled ports are enabled in response to the shift magnitude commands, for directing data presented at the enabled controlled ports to the common-node port and for directing data presented at the common-node port to the enabled controlled ports; and shift control means responsive to the shift direction commands, having a first port which is coupled to the common-node port of the multiplexer means and having a second port which is coupled to a selected controlled port of the multiplexer means in the N+1st stage, and coupled to one of the plurality of signal lines in the bus, for temporarily storing a data bit and for controlling the direction of propagation of the data bit between the first and second ports;

wherein the multiplexer means in the Nth stage have M−N controlled ports and further wherein the first controlled port of said multiplexer means is coupled to the second port of the shift control means in the N+1st stage, and the jth controlled port of the multiplexer means in the Nth stage is coupled to the j+1st controlled port of the multiplexer means in the N−1st stage, the jth controlled ports of each stage being enabled in common, where N=1, 2, ..., M, and j=2, 3, ..., M−N, so that the data bits are provided to the bus shifted in position by a magnitude determined by the shift magnitude command and a direction determined by the shift direction commmands.

2. An apparatus for shifting the position of data bits which are arranged in an ordered sequence of M positions, in accordance with shift magnitude commands and shift direction commands, comprising M stages which communicate with one another and which each define a position, wherein a stage N includes multiplexer means responsive to the shift magnitude commands and having a common-node port and a plurality of controlled ports for individually enabling ones of the controlled ports in response to the shift magnitude commands so that data presented at the enabled controlled ports are directed to the common-node port and so that data presented at the common-node port are directed to the enabled controlled ports; and shift control means responsive to the shift direction commands, having a first port which is coupled to the common-node port of the multiplexer means and having a second port which is coupled to a selected controlled port of the multiplexer means in the N+1st stage, for temporarily storing a data bit and for controlling the direction of propagation of the data bit between the first and second ports; wherein the multiplexer means in the Nth stage have M−N controlled ports and further wherein the first controlled port of said multiplexer means is coupled to the second port of the shift control means in the N+1st stage, and the jth controlled port of the multiplexer means in the Nth stage is coupled to the j+1st controlled port of the multiplexer means in the N−1st stage, the jth controlled ports of each stage being enabled in common, where N=1, 2, ..., M, and j=2, 3, ..., M−N.

3. An apparatus for shifting the position of data bits which are arranged in an ordered sequence of M positions, in accordance with shift magnitude commands and shift direction commands, wherein each data bit in the sequence is provided from a different one of a plurality of signal lines in a bus, comprising M multiplexer means connected to communicate with one another and responsive to the shift magnitude commands for routing the data bits to the desired positions, the Nth multiplexer means including M−N controlled ports and a common port, where N=1, 2, ..., M, wherein the jth controlled port is coupled to the j+1st controlled port of the N−1st multiplexer means, where j=2, 3, ..., M−N, and further wherein the jth controlled port in each of the M multiplexer means is controlled in common; and M shift control means coupled to the bus and responsive to the shift direction commands and having a first shift port and a second shift port for temporarily storing the data bits from the bus and for controlling the direction of propagation of the data bit between the first and second shift ports, wherein for the Nth shift control means the first shift port is coupled to the common port of the Nth multiplexer means and the second shift port is coupled to the first controlled port of the N−1st multiplexer means.

4. The apparatus of claim 3 wherein each of the M multiplexer means comprise a bidirectional multiplexer.

5. The apparatus of claim 4 wherein the bidirectional multiplexer includes a 1 to one of N selector.

6. The apparatus of claim 3 wherein the shift direction commands include read/write commands and wherein each of the M shift control means include memory means coupled to the bus for storing data;

means responsive to the shift direction commands and coupled to the memory means for routing data between the memory means and the first and second shift ports; and means responsive to the read/write commands for controlling the flow of data between the bus and the memory means.

7. The apparatus of claim 6 wherein the routing means comprise a bidirectional multiplexer.

8. The apparatus of claim 6 wherein the memory means include a first latch coupled to the bus and to the routing means for receiving data from the bus and for providing data to the routing means; and a second latch coupled to the bus and to the routing means for providing data to the bus and for receiving data from the routing means, wherein the first latch is controllably coupled to receive data from the second latch.

9. An apparatus for shifting the position of data bits which are arranged in an ordered sequence of M positions, in accordance with shift magnitude commands and shift direction commands, wherein each data bit in the sequence is provided from a different one of a plurality of signal lines in a bus, comprising M shift control means coupled to receive the data bits from the bus, responsive to the shift direction commands, and having a first shift port and a second shift port for temporarily storing the data bits from the bus and for controlling the direction of propagation of the data bit between the first and second shift ports; and M multiplexer means connected to communicate with one another and with the M shift control means and responsive to the shift magnitude commands for routing the data bits among the M shift control means wherein each multiplexer means N includes M−N controlled ports and a common port, where N=1, 2, ..., M, wherein for a shift control means N the first shift port is coupled to the common port of the Nth multiplexer means and the second shift port is coupled to the first controlled port of the N−1st multiplexer means, and further wherein for each multiplexer means N the jth controlled port is coupled to the second shift port of the N+jth shift control means, the jth controlled port in each multiplexer means being enabled in common.

10. An apparatus for shifting M groups of data bits within a data word in which the data bits in each group occupy a predefined position within each group in accordance with shift magnitude commands and shift direction commands, comprising a plurality of shift blocks each of which is associated with a different one of the groups of data bits, wherein each shift block receives a data bit from a predetermined bit position in each of the M groups of data bits so that each shift block operates upon M data bits arranged in an ordered sequence, and further wherein each of the plurality of shift blocks include M stages which communicate with one another and which each define a position, wherein a stage N includes multiplexer means responsive to the shift magnitude commands and having a common-node port and a plurality of controlled ports for individually enabling ones of the controlled ports in response to the shift magnitude commands so that data presented at the enabled controlled ports are directed to the common-node port and so that data presented at the common-node port are directed to the enabled controlled ports; and shift control means responsive to the shift direction commands, having a first port which is coupled to the common-node port of the multiplexer means and having a second port which is coupled to a selected controlled port of the multiplexer means in the N+1st stage, for temporarily storing a data bit and for controlling the direction of propagation of the data bit between the first and second ports;

wherein the multiplexer means in the Nth stage have M−N controlled ports and further wherein the first controlled port of said multiplexer means is coupled to the second port of the shift control means in the N+1st stage, and the jth controlled port of the multiplexer means in the Nth stage is coupled to the j+1st controlled port of the multiplexer means in the N−1st stage, the jth controlled ports of each stage being enabled in common, where N=1, 2, ..., M, and j=2, 3, ..., M−N.

* * * * *